United States Patent
Furuta (10) Patent No.: US 7,104,285 B2
(45) Date of Patent: *Sep. 12, 2006

(54) HOSE WITH CORRUGATED METAL TUBE

(75) Inventor: Norihiko Furuta, Aichi-ken (JP)

(73) Assignee: Tokai Rubber Industries, Inc., (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/630,612

(22) Filed: Jul. 30, 2003

(65) Prior Publication Data

US 2004/0020546 A1 Feb. 5, 2004

(30) Foreign Application Priority Data

Jul. 30, 2002 (JP) .................. 2002-221895

(51) Int. Cl.
*F16L 11/00* (2006.01)
(52) U.S. Cl. .............. 138/121; 138/109; 138/127; 138/131; 138/134
(58) Field of Classification Search ........... 138/121, 138/122, 130, 131, 134, 127, 109
See application file for complete search history.

(56) References Cited

U.S. PATENT DOCUMENTS

| | | | | |
|---|---|---|---|---|
| 2,256,386 A * | 9/1941 | Farrar et al. | ............. | 138/131 |
| 2,438,146 A * | 3/1948 | Ellsworth et al. | ........ | 174/68.3 |
| 2,449,369 A * | 9/1948 | Lewis et al. | ............ | 138/121 |
| 2,785,382 A * | 3/1957 | Lamb | ................. | 333/241 |
| 3,318,337 A * | 5/1967 | Bauer | ................. | 138/130 |
| 3,580,289 A * | 5/1971 | James, Jr. et al. | ........ | 138/121 |
| 3,599,677 A * | 8/1971 | O'Brien | ............... | 138/122 |
| 3,951,438 A * | 4/1976 | Scales | ................. | 285/55 |
| 4,147,185 A * | 4/1979 | Hines | ................ | 138/121 |
| 4,674,543 A * | 6/1987 | Ziemek et al. | .......... | 138/153 |
| 4,953,632 A * | 9/1990 | Sakaya et al. | ........ | 165/104.26 |
| 5,069,253 A * | 12/1991 | Hadley | ............... | 138/109 |
| 5,279,333 A * | 1/1994 | Lawrence | .............. | 138/121 |
| 5,297,337 A * | 3/1994 | Igarashi et al. | ........ | 29/890.144 |
| 5,297,586 A * | 3/1994 | McIntosh | ............. | 138/109 |
| 5,398,977 A * | 3/1995 | Berger et al. | ........ | 285/123.17 |
| 5,413,147 A * | 5/1995 | Moreiras et al. | ........ | 138/109 |
| 5,911,448 A * | 6/1999 | Feher | ............... | 285/222.5 |
| 6,053,213 A * | 4/2000 | Jung et al. | ............. | 138/130 |
| 6,354,332 B1 * | 3/2002 | Burkhardt et al. | ....... | 138/109 |
| 6,550,502 B1 * | 4/2003 | Odru | ................ | 138/135 |
| 6,761,188 B1 * | 7/2004 | Besche et al. | ............ | 138/126 |
| 2001/0021426 A1 * | 9/2001 | Procida et al. | ........... | 428/35.8 |
| 2002/0007860 A1 | 1/2002 | Katayama et al. | | |
| 2002/0117226 A1 * | 8/2002 | Malcarne, Jr. | .......... | 138/121 |
| 2003/0066568 A1 * | 4/2003 | Hibino et al. | ........... | 138/121 |
| 2004/0020545 A1 * | 2/2004 | Takagi et al. | ........... | 138/109 |
| 2004/0090065 A1 * | 5/2004 | Furuta et al. | ........... | 285/256 |
| 2004/0118470 A1 * | 6/2004 | Furuta | ................ | 138/139 |
| 2004/0200537 A1 * | 10/2004 | Rivest | ................ | 138/109 |

FOREIGN PATENT DOCUMENTS

| | | |
|---|---|---|
| JP | U 51-150511 | 5/1950 |
| JP | A 2001-182872 | 7/2001 |

* cited by examiner

*Primary Examiner*—James Hook
(74) *Attorney, Agent, or Firm*—Andrus, Sceales, Starke & Sawall, LLP (57) ABSTRACT

A hose with corrugated metal tube comprises a corrugated metal tube as innermost layer and outer layer in a radially outer side thereof including elastic layer and reinforced layer. The reinforced layer is braided with reinforcing filament members at a braid or winding angle which is a low angle, 40 degrees or lower.

2 Claims, 8 Drawing Sheets

HOSE WITH CORRUGATED METAL TUBE

CROSS-REFERENCE TO RELATED APPLICATION

The present invention asserts priority on Japanese Patent Application No. 2002-221895 filed Jul. 30, 2002.

BACKGROUND OF THE INVENTION

The present invention relates to a hose with corrugated metal tube, which is suitable for fuel conveying hose for automobiles, refrigerant conveying hose or any other fluid conveying hose, and more particularly to a hose with corrugated metal tube including characteristic reinforced layer.

Typical rubber hoses, for example, made of blended product of acrylonitrile-butadiene rubber and polyvinyl chloride (NBR/PVC blend) which is excellent in resistance to gasoline permeability, have been used for conveying fuel for automobiles or the like in view of their high vibration-absorbability, easy assembling or the like. However, for the purpose of global environment protection, the regulations have been recently tighten against permeation of fuel for automobiles or the like, and are anticipated to be further tighten in the future. Further, hoses are demanded to meet the requirements to convey highly permeable fluid such as hydrogen gas used in fuel cells or carbon dioxide ($CO_2$) refrigerant.

Then it is anticipated difficult to satisfy the future requirements with hoses made only of organic materials such as rubber or resin.

Accordingly, it is currently considered to adapt a hose with a corrugated metal tube as an inner layer because the hose with corrugated metal tube is expected to have an extremely high fluid impermeability to meet the demand for a fluid impermeable hose.

As for a hose with corrugated metal tube, such hoses as disclosed in the following Document 1, Document 2 and Document 3 are known.

| | |
|---|---|
| Document 1 | JP, A, 2001-182872 |
| Document 2 | US20020007860A1 |
| Document 3 | JP, U, 51-150511 |

In case of the hose with corrugated metal tube, even if adapted for hydrogen gas used for fuel cells, a corrugated metal tube in or as an inner layer reduces gas permeation zero, i.e., completely eliminates permeation of gas.

However, if the hose with corrugated metal tube is adapted, it will be a problem how to construct a reinforcing structure with a reinforced layer.

Figure 6:
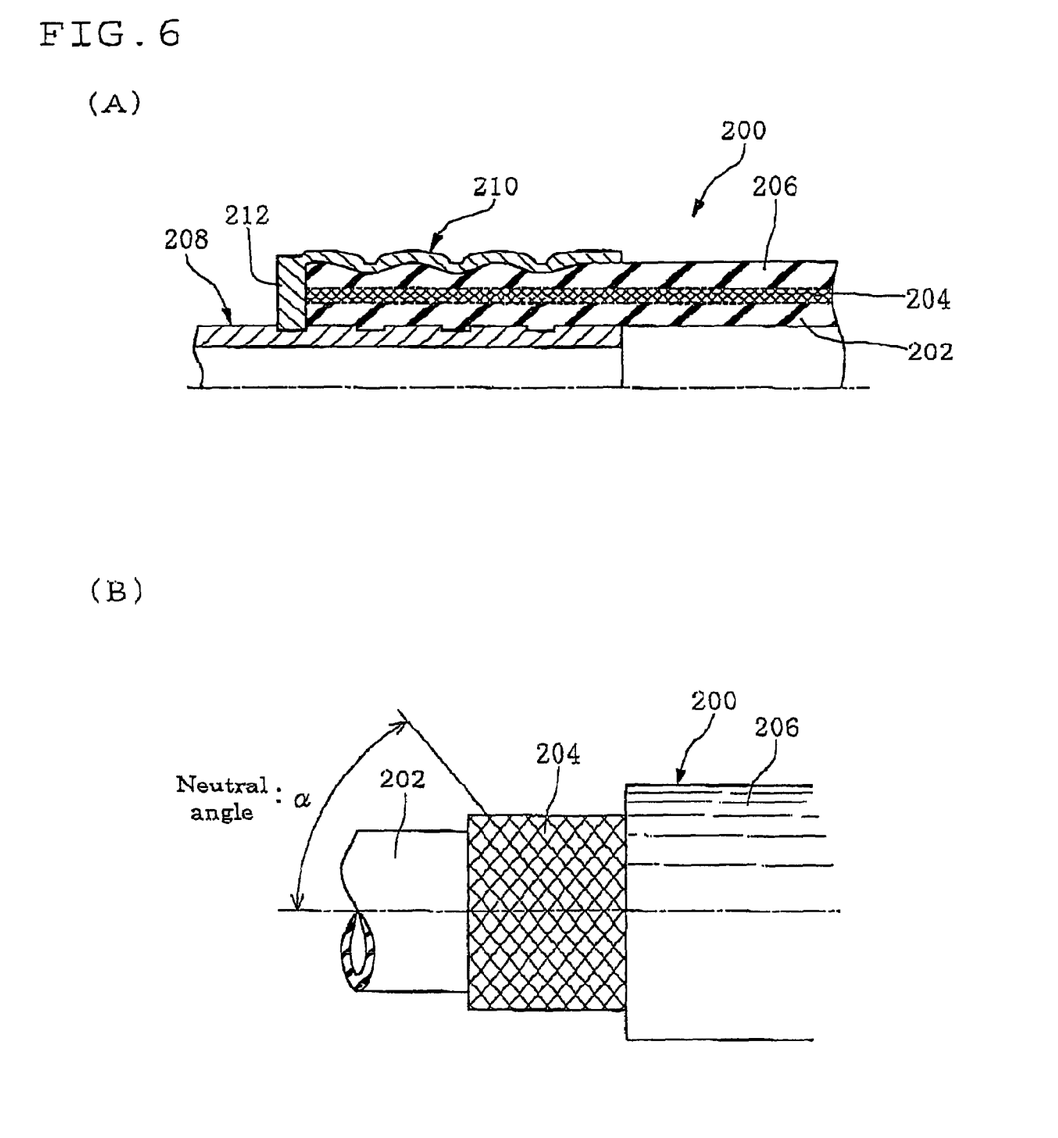
Figure 7:
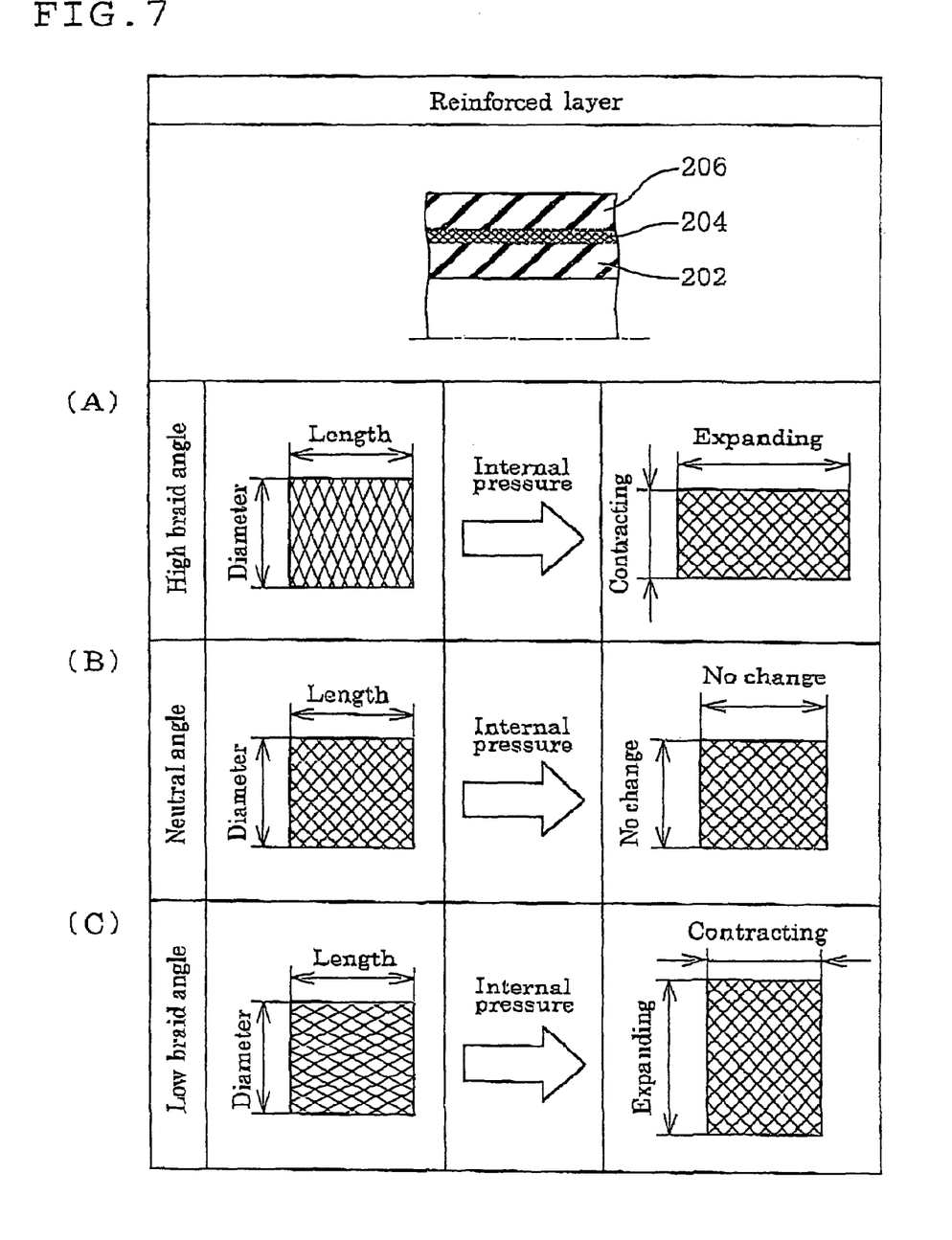
FIG. 7 is an explanatory view showing status of a reinforced layer of the hose in FIG. 6 when the hose is subject to internal pressure.

As shown in FIG. 6, a typical conventional hose usually has a hose body 200 of multi-layered construction including inner elastic layer 202, reinforced layer 204 and outer elastic layer 206. The reinforced layer 204 is constructed by reinforcing filament member or reinforcing filament members. If a winding or braid angle of reinforcing filament member or reinforcing filament members in the reinforced layer 204 or a winding or braid angle thereof with respect to an axial direction is higher or larger than a neutral angle α (refer to FIG. 6 (B)), which of reinforcing filament member or reinforcing filament members is 54 degrees 44 minutes (54° 44') in this case, the reinforced layer 204 overall expands or elongates longitudinally, extracts and deforms in a radial or diametrical direction so as to make a braid or winding angle of reinforcing filament member or reinforcing filament members close to or to be a neutral angle α when an internal pressure is exerted thereto as shown in FIG. 7 (A). Here and so forth, it is based on the hypothesis that reinforcing filament member itself or reinforcing filament members themselves do not elongated. And in "braid angle" of FIG. 7 a winding angle is also included.

On the contrary, as shown in FIG. 7 (C), if a braid or winding angle of the reinforcing lament member or the reinforcing filament members in the reinforced layer 204 are lower or smaller than a neutral angle α, the hose including the reinforced layer 204 overall contracts in a longitudinal direction and expands and deforms in a radial direction so as to make a braid or winding angle thereof close to or to be a neutral angle α when an internal pressure is exerted thereto.

And, as shown in FIG. 7 (B), if a braid or winding angle of reinforcing filament member or reinforcing filament members in the reinforced layer 204 is initially a neutral angle α, the reinforcing filament member or the reinforcing filament members remain at an angle α or a neutral angle α as it was when an internal pressure is exerted thereto. Therefore, the hose overall does not substantially expand and contract in a longitudinal direction, and also does not substantially expand and contract in a radial direction.

In FIG. 6, a numeral reference 208 indicates a rigid pipe-shaped connecting part inserted in the hose body 200 on an axial end portion thereof, a numeral reference 210 a metallic socket fitting fitted onto or on an outer surface of the hose body 200. The hose body 200 is fixedly secured to the connecting part 208 and the socket fitting 210 while clamped radially in between the connecting part 208 and the socket fitting 210, by securely compressing or swaging the socket fitting 210 radially inwardly thereto.

In FIG. 6, a numeral reference 212 indicates an inwardly directed collar-like portion formed on an axial end of the socket fitting 210. In this state, the collar-like portion 212 fits in and engages with a fit-engagement groove formed on an outer surface of the connecting part 208.

As stated above, in general, a typical conventional hose tends to expand, contract and deform in radial and longitudinal directions depending on a braid or winding angle of a reinforced layer when an internal pressure is exerted thereto.

Figure 8:
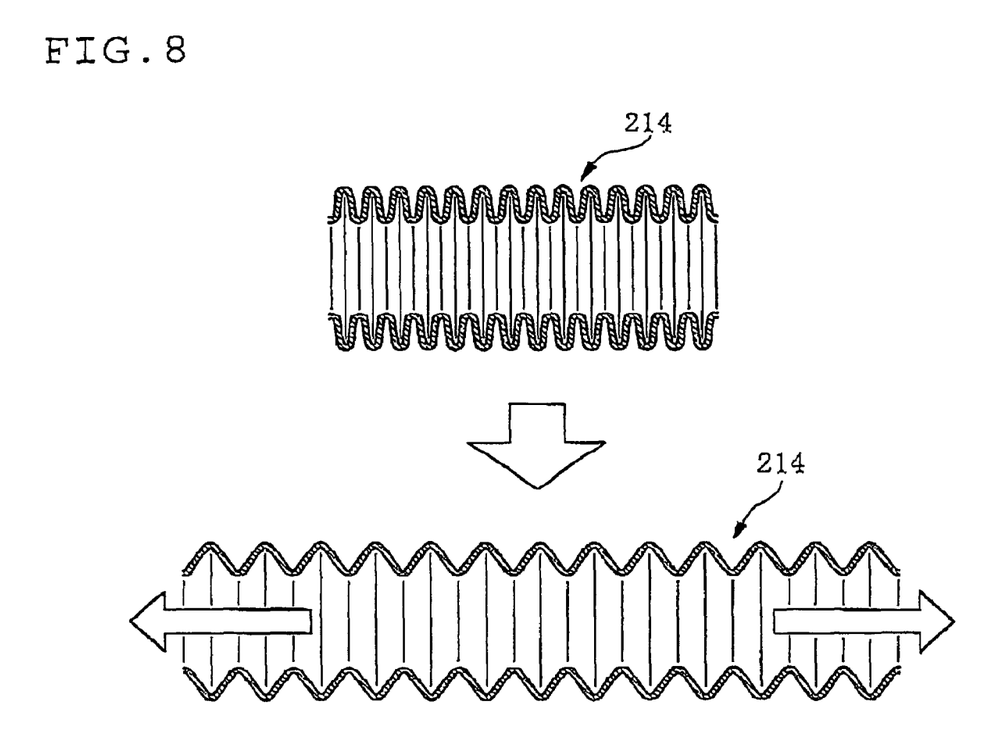
FIG. 8 is an explanatory view showing movement of a corrugated metal tube.

However, a hose including a corrugated metal tube 214 as inner layer as shown in FIG. 8 tends to expand and deform uniformly in a longitudinal direction regardless of a braid or winding angle of a reinforced layer when an internal pressure is exerted thereto.

Therefore, such hose with corrugated metal tube inherently involves a problem that when an internal pressure is exerted thereto repeatedly, the hose including the corrugated metal tube 214 overall repeatedly elongates or expands in a longitudinal direction, and consequently repeated deformation thereof causer a fatigue break in the corrugated metal tube 214.

The above are described with reference to a hose for conveying hydrogen gas used in a fuel cell as example. The similar problems are anticipated in common to any hoses. For example, it may be the case that a hose with corrugated metal tube is employed for conveying fuel gasoline for the purpose to deal with gasoline or the like permeating to an air or, for high temperature and high pressure application due to high output power of equipment, where low permeation is severely regulated. Or it may be the case that a hose with corrugated metal tube is employed to convey carbon dioxide ($CO_2$) as refrigerant fluid, which is low in amount of particles just like hydrogen and has high gas permeation.

Further, it may be any other case that a hose with corrugated metal tube is applied in fields under severe regulations against gas permeation.

It is an object of the present invention to provide a hose with corrugated metal tube to settle the problems described above.

SUMMARY OF THE INVENTION

According to the present invention, there is provided a novel hose with corrugated metal tube comprising inner layer having a corrugated metal tube or a corrugated metal tube as inner layer, outer layer circumscribing a radial outer side thereof and reinforced layer having reinforced filament member or reinforcing filament members and included in the outer layer. And the reinforcing filament member or the reinforcing filament members in the reinforced layer may be arranged at a braid or winding angle of an angle with respect to an axis or an axial direction which is a low angle, 40 degrees (40°) or lower.

In case of the hose with corrugated metal tube, a corrugated metal tube i.e. a hose overall tends to expand or elongate in a longitudinal direction when an internal pressure is exerted thereto. But such expansion and deformation thereof may be effectively prevented by resistance behavior of the reinforced layer braided or winded with reinforcing filament member at a low angle, 40 degrees or lower.

Thereby a problem may be solved that a hose repeatedly largely expands and deforms in a longitudinal direction by an internal pressure and such repeated deformation causes fatigue-break in the corrugated metal tube.

Meanwhile, the reinforced layer braided or winded with reinforcing filament member at a braid or winding angle of 40 degrees or lower generates great resistance to expansion, elongation and deformation in a longitudinal direction, but generates no substantial or no considerable resistance to expansion and deformation in a radial direction.

Therefore, if a corrugated metal tube does not have sufficient strength to overcome a force acting on a radially expanding direction, it is preferred to provide other reinforced layer separately for reinforcing the corrugated metal tube.

In another aspect of the present invention, at least a first reinforced ply and a second reinforced ply may be provided in the reinforced layer. In one of the first and the second reinforced plies, reinforcing filament member or reinforcing lament members may be arranged at a braid or winding angle of an angle with respect to an axis or an axial direction which is lower than a neutral angle, and in the other thereof, reinforcing filament member or reinforcing filament members may be arranged at a braid or winding angle of an angle with respect to an axis which is higher than a neutral angle.

In this case, the hose with corrugated metal tube has a reinforced ply braided or winded with reinforcing filament member at a higher braid or winding angle than a neutral angle, provided additionally to a reinforced ply braided or winded with reinforcing filament member at a low braid or winding angle. Longitudinal expansion and deformation of the hose may be restrained by either one of the first and the second reinforced ply, i.e. one braided or winded with reinforcing filament member at a low braid or winding angle. Further, radial expansion and deformation thereof may be effectively restrained by the other reinforced ply.

In this case, the reinforced ply braided or winded at a low braid or winding angle may be arranged in a radially inner side, and the reinforced ply braided or winded with reinforcing filament member at a high braid or winding angle in a radially outer side.

In yet another aspect of the present invention, the reinforced layer may be constructed to include at least one ply of canvas. The ply of canvas may be constructed by warp or longitudinal reinforcing filament member or reinforcing filament members substantially parallel to an axis or in an axial direction and weft or lateral reinforcing filament member or reinforcing filament members substantially perpendicular to an axis.

In the hose with corrugated metal tube, also, large longitudinal expansion and deformation of the hose overall along with expansion of the corrugated metal tube may be restrained, while radial expansion and deformation of the hose may be restrained by the weft or lateral reinforcing filament member or reinforcing filament members of canvas.

Now, the preferred embodiments of the present invention will be described in detail with reference to the drawings.

BRIEF DESCRIPTION OF THE DRAWINGS

FIG. 1 (A) is a perspective view which includes a cross-sectional view of a relevant part of a hose with corrugated metal tube as one embodiment according to the present invention.

FIG. 1 (B) is a perspective view showing multi-layer construction of the hose with corrugated metal tube.

FIG. 2 (A) is a cross-sectional view showing a construction of the hose with corrugated metal tube.

FIG. 2 (B) is a view showing a relevant part of the hose with corrugated metal tube.

FIG. 6 (A) is a cross-sectional view showing a construction of a conventional hose without corrugated metal tube.

FIG. 6 (B) is a view showing a relevant part of the conventional hose without corrugated metal tube.

DETAILED DESCRIPTIONS OF PREFERRED EMBODIMENTS

Figure 1:
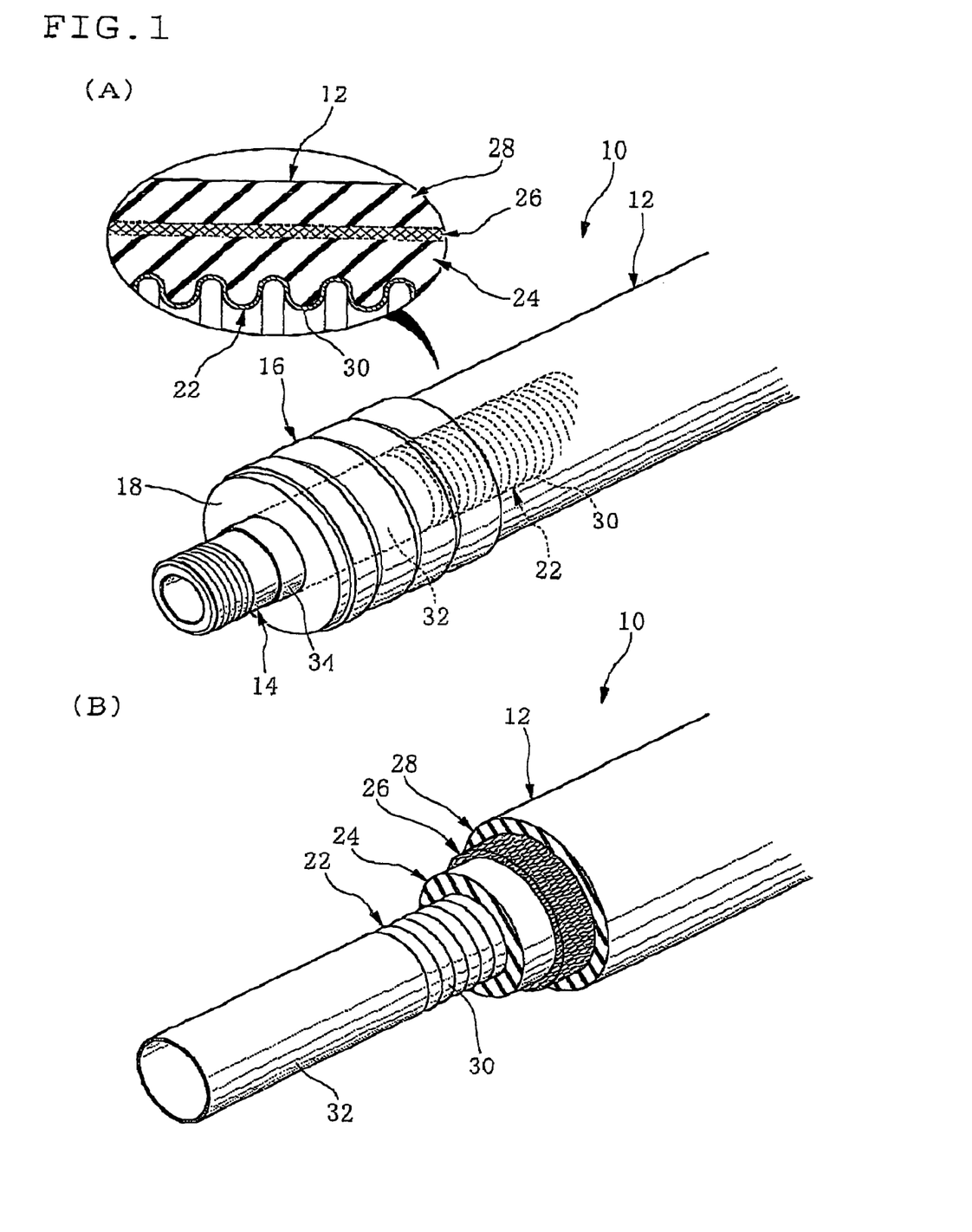
Figure 2:
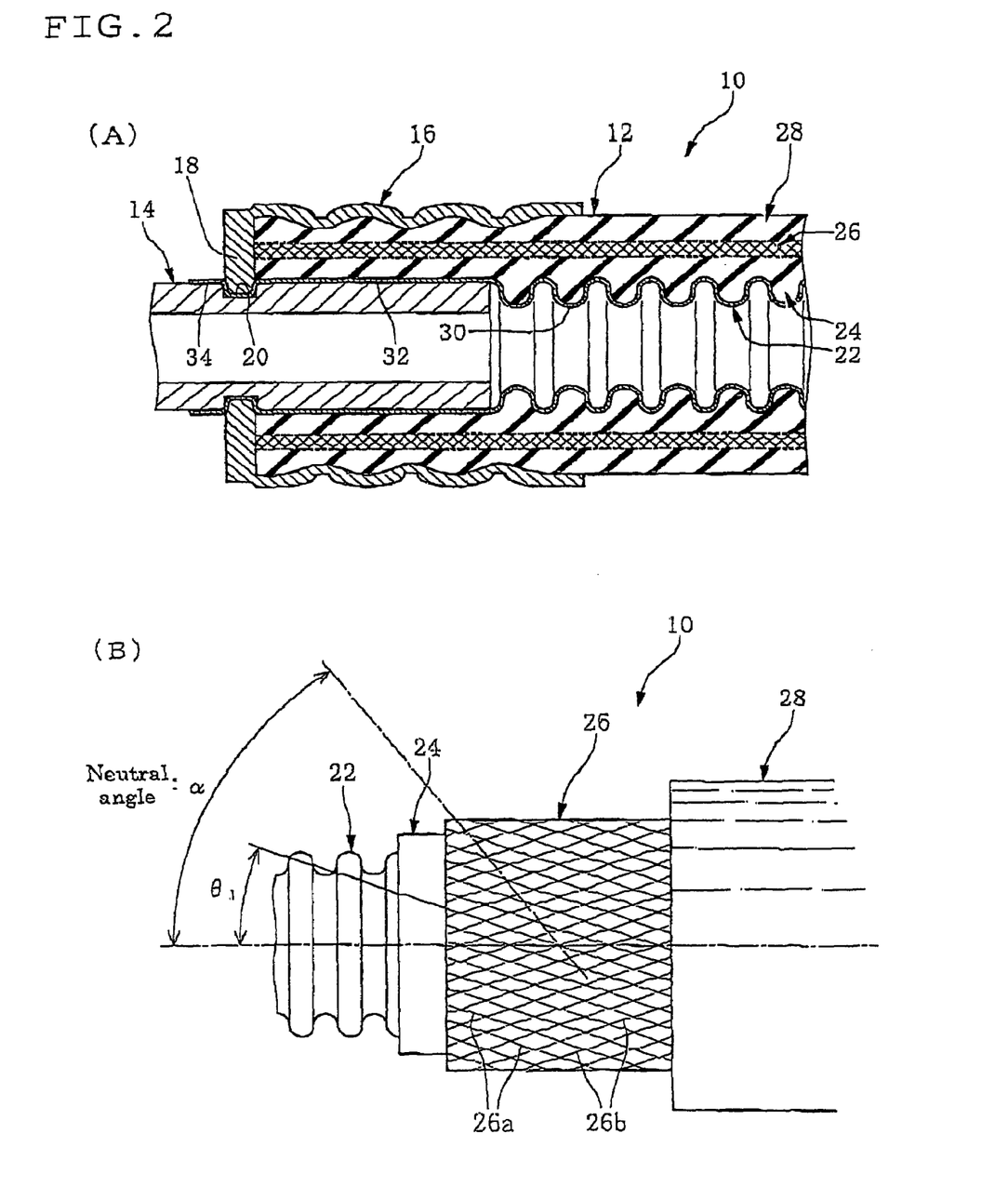

In FIGS. 1 and 2, a numeral reference 10 indicates a hose with corrugated metal tube (hereinafter referred to as a hose) which is preferably adapted for hydrogen or hydrogen gas conveys hose, refrigerant conveying hose for air conditioners, automobile fuel conveying hose or the like. A numeral reference 12 indicates a hose body, a numeral reference 14 a pipe-shaped metallic connecting part fixed to the hose body 12, and a numeral reference 16 a metallic socket fitting fitted onto or on an outer surface of the hose body 12.

The socket fitting 16 is securely compressed or swaged radially inwardly to the hose body 12 and thereby the connecting part 14 is, along with the socket fitting 16, fixedly secured to an end portion of the hose body 12.

As shown in FIG. 2, the socket fitting 16 has a sleeve and a radially inwardly directed collar-like portion 18 on an axial end thereof, while the connecting part 14 is formed with a fit-engagement groove 20 at a position axially corresponding to the collar-like portion 18 on a radially outer surface thereof. The collar-like portion 18 or an inner end portion of the collar-like portion 18 is fitted in and engaged with the fit-engagement groove 20 by securely compressing or swaging the socket fitting 16 radially inwardly to the hose body 12.

As shown in FIG. 2, the hose body 12 has a corrugated metal tube 22 as an innermost layer and multi-layers, an inner elastic layer 24, a reinforced layer 26 and an outer elastic layer 28 which circumscribe an outer side of the corrugated metal tube 22. As shown in FIG. 2, the corrugations on the corrugated metal tube 22 are annular. Each of the layers is fixedly bonded in unitary relation to an adjacent layer into a composite hose by vulcanizing or other manner.

In this embodiment, the inner elastic layer 24, the reinforced layer 26 and the outer elastic layer 28 construct otter layer circumscribing the corrugated metal tube 22.

The reinforced layer 26 may be a wire-reinforced layer or a fiber-reinforced layer.

And the inner elastic layer 24 and the outer elastic layer 28 may be made of elastic material such as rubber.

On the other hand, the corrugated metal tube 22 as an innermost layer is formed with corrugations 30 for generally entire axial length thereof, which provides the corrugated metal tube 22 with flexibility.

That is, although, in this embodiment, an innermost layer of the hose 10 includes a metal tube, the hose 10 is provided entirely with flexibility, thanks to the corrugations 30 formed on the metal tube.

The corrugated metal tube 22 may be made of materials such as steel products including stainless steel, copper, copper alloy, aluminum, aluminum alloy, nickel, nickel alloy, titanium or titanium alloy, and preferably may be made of stainless steel.

A wall thickness of the corrugated metal tube 22 may be from 20 to 500 μm preferably is minimum 50 μm in view of preventing defects such as pinholes and further in view of processing of the corrugations 30 or the like, and maximum 300 μm in view of flexibility and durability.

The corrugated metal tube 22 has an axially straight-walled portion, or straight pipe portion 32 on an axial end side.

The corrugated metal tube 22 or the straight-walled portion 32 is configured as an extending portion 34 on a leading end side, which extends in an axial direction and is exposed out of the outer layer comprising the inner elastic layer 24, the reinforced layer 26 and the outer elastic layer 28.

And, the extending portion 34 is clamped radially with an inner end portion of the collar-like portion 18 and the fit-engagement groove 20 of the connecting part 14 by securely compressing or swaging the socket fitting 16. The corrugated metal tube 22 is firmly fixed to the connecting part 14 at the fit-engagement groove 20, while an air tight seal is provided between the corrugated metal tube 22 and an outer surface of the connecting part 14.

Securing structure between an end portion of the corrugated metal tube 22 and the connecting part 14 as stated is only one of embodiments. According to a shape or the like of the connecting part 14, securing structure and sealing structure may be constructed in various manners to secure an end portion of the corrugated metal tube 22 to the connecting part 14 of various shapes and to provide a seal therebetween.

As shown in FIG. 2 (B), the reinforced layer 26 is constructed or braided by reinforcing filament members 26a and 26b of wire or organic fiber or the like, at opposed angled relation with one another or at opposed angled relation with respect to an axial direction and at a braid angle $\theta_1$. For example, in a hose including a corrugated metal tube made of stainless steel, with 0.15 mm thick wall and 1.0 mm pitch corrugations, an axial elongation thereof is preferably 5% or less in order to restrain metal fatigue of the corrugated metal tube resulting from an axial expansion or the like thereof. Therefore, a braid angle of reinforcing filament member has to be preferably 40 degrees or lower. Thereby an axial expansion and contraction of the hose is restrained effectively and effects to reduce metal fatigue of the corrugated metal tube may be obtained.

Here, although a smaller braid angle bus about more effects of restraining an axial expansion and contraction of the hose 10, on the contrary, a smaller braid angle apts to untie or loosen braided reinforced layers. For example, if a braided reinforced layer has a braid angle of 0 degree, the layer is constructed only with warp filaments. However, the warp filaments are not arranged and retained in circumferentially uniform relation. Therefore if the braided layer is bent during production process or after assembled in a hose, filaments of the layer are awkwardly displaced or deformed so as to be buckled.

Therefore, a braid angle of reinforcing filament member is more preferably in the range from 15 degrees (15°) to 40 degrees (40°).

In this embodiment, a braid angle $\theta_1$ of reinforcing filament members 26a, 26b are defined 36 degrees (36°), a low angle lower than 40 degrees.

Compared to reinforced layer where reinforcing filament members are braided at neutral angle, in the reinforced layer 26, each of reinforcing filament members 26a and 26b is arranged at an angle so as to lean more toward an axial or an axial direction.

In the hose 10 of this embodiment as stated above, behavior of an internal pressure hardly expands or elongates overall the hose 10 along with the corrugated metal tube 22 in a longitudinal direction. Because longitudinal expansion of the hose 10 is effectively prevented by resistance to longitudinal expansion of the hose 10 which is brought about by the reinforced layer 26 having reinforcing filament members 26a and 26b braided at braid angle of 36 degrees.

Then a problem is thereby solved that a hose largely expands and deforms repeatedly in a longitudinal direction and such repeated deformation of the hose causes fatigue break in the corrugated metal tube 22.

Figure 3:
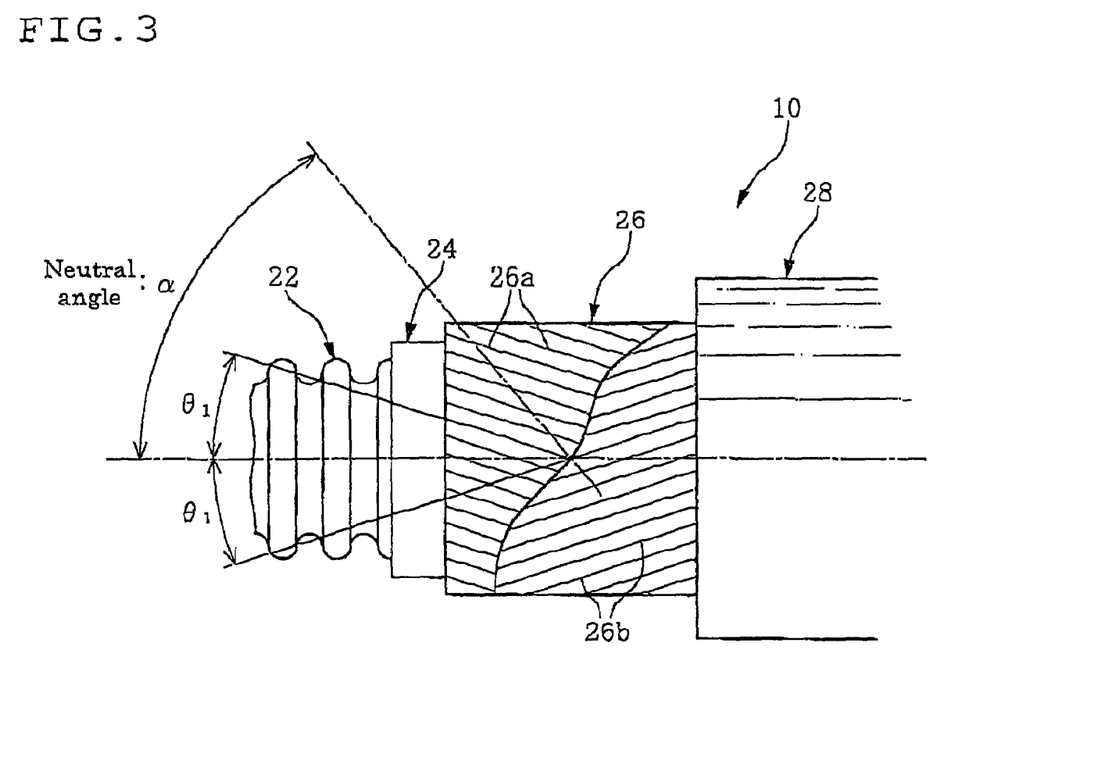
FIG. 3 is a view showing a relevant part of another hose with corrugated metal tube as another embodiment according to the present invention.

In the above embodiment, the reinforcing filament members 26a, 26b are interlaced or braided to construct the single reinforced layer 26. Alternatively, as shown in FIG. 3, the reinforcing filament members 26a, 26b may be individually spirally wounded in opposed directions each other to construct the single reinforced layer 26.

However, in the latter case, an angle $\theta_1$ defined by each of the reinforcing filament members 26a, 26b, namely a winding angle may be a low angle, 45 or 40 degrees or lower, for example 36 degrees.

Figure 4:
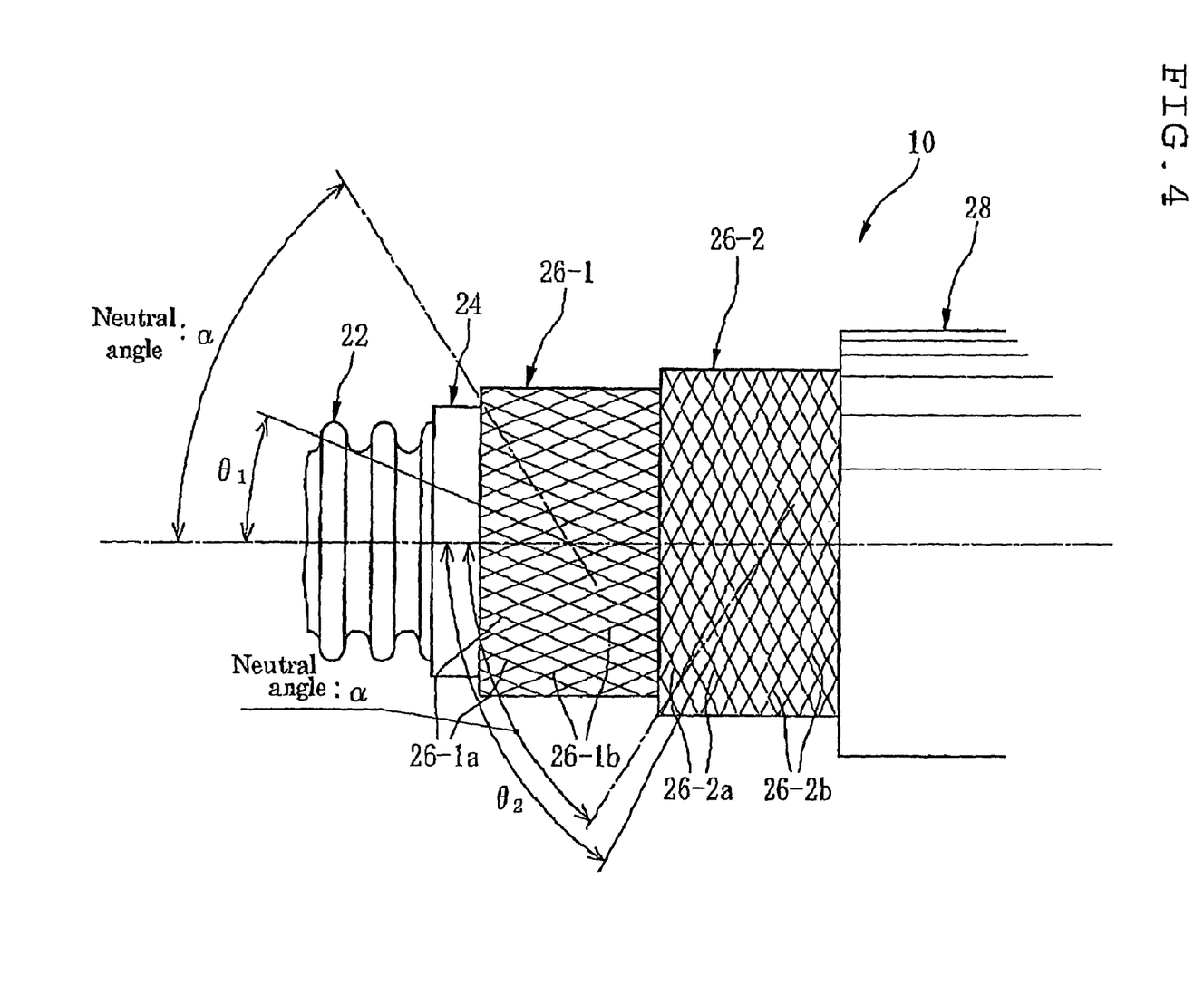
FIG. 4 is a view showing a relevant part of yet another hose with corrugated metal tube as yet another embodiment according to the present invention.

FIG. 4 shows yet another embodiment according to the present invention. In this embodiment, a second reinforced ply 26-2 is arranged additionally to the first ply 26-1 braided at a braid angle $\theta_1$ lower than a neutral angle $\alpha$. The second ply 26-2 is braided at a braid angle $\theta_2$ higher than a neutral angle $\alpha$, in this embodiment at 56 degrees (56°).

According to this embodiment, longitudinal expansion of the hose 10 is restrained by the fist reinforced ply 26-1 braided at low braid angle. Additionally, radial expansion and deformation of the hose 10 is effectively restrained by the second reinforced ply 26-2 braided at high braid angle.

In this embodiment, the first reinforced ply 26-1 with braid angle $\theta_1$, lower than a neutral angle $\alpha$ is arranged in a radially inner side, and the second reinforced ply 26-2 with braid angle $\theta_2$ higher than a neutral angle $\alpha$ is arranged in a radially outer side. In some cases, the first reinforced ply 26-1 and the second reinforced ply 26-2 may be arranged in inverted order respectively, the first reinforced ply 26-1 in a radially outer side and the second reinforced ply 26-2 in a radially inner side.

Figure 5:
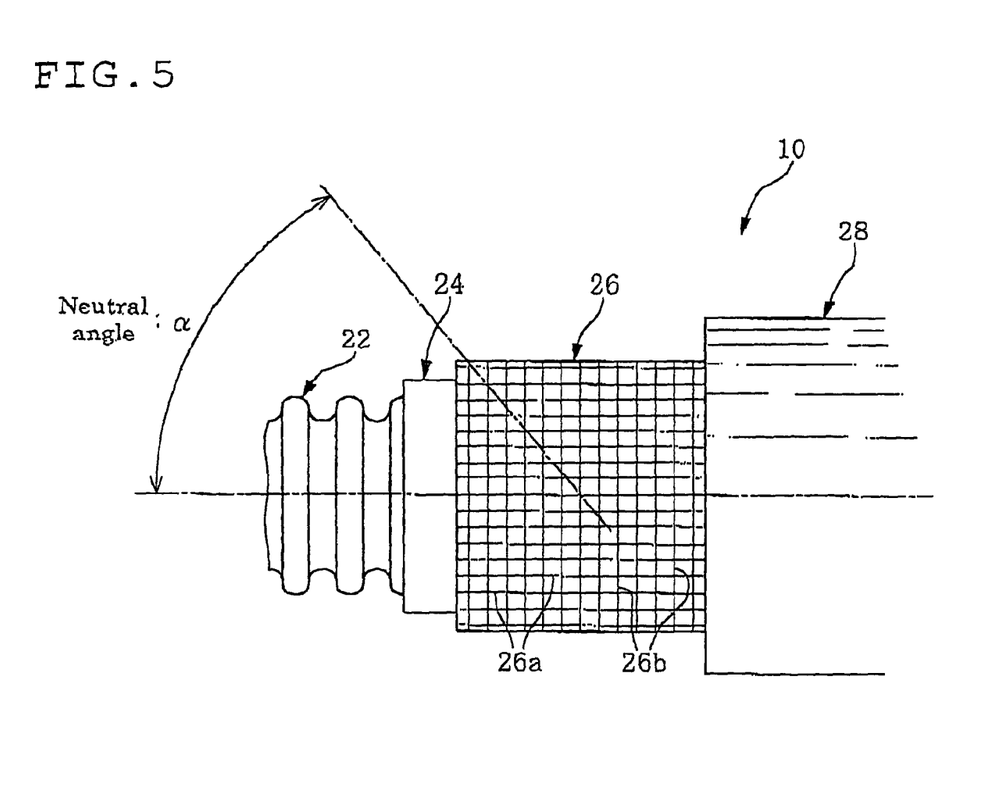
FIG. 5 is a view showing a relevant part of fiber another hose with corrugated metal tube as further another embodiment according to the present invention.

FIG. 5 shows further another embodiment according to the present invention.

In this embodiment, the reinforced layer 26 is made of canvas where the warp or longitudinal reinforcing filament member 26a and the weft or lateral reinforcing filament member 26b are woven or braided. Here, the warp reinforcing filament member 26a is arranged parallel to an axis and the weft reinforcing filament member 26b arranged perpendicular to an axis.

Also, according to this embodiment, large longitudinal expansion and deformation of the hose 10 overall accompanied by expansion of the corrugated metal tube 22 may be restrained by the warp or longitudinal reinforcing filament member 26a, while radial expansion and deformation of the hose 10 may be restrained by the weft or lateral reinforcing filament member 26b of canvas.

Although the preferred embodiments have been described above, these are only some of embodiments of the present invention.

For examples the present invention may be adapted for various types of fluid conveying hose, other than the ones as in the above embodiments. Such variations are intended to be within the scope of the present invention and the following claims.

I claim:

1. An elongated hose with corrugated metal tube for conveying highly permeable fluid comprising:

an inner layer comprising a corrugated metal tube having corrugation hills and valleys, wherein the corrugation hills and valleys are annular;

an outer layer circumscribing a radial outer side of the inner layer;

a reinforced layer having reinforcing filament members and included in the outer layer, the reinforcing filament members being braided at a low braid angle, 40 degrees or lower, with respect to an axis, the reinforced layer thereby generating sufficient resistance to pressure exerted repeatedly by fluid conveyed by the hose;

a pipe-shaped connecting part formed with a fit-engagement groove on an outer peripheral surface thereof, the connecting part being inserted in a straight-walled portion formed on an axial end side of the corrugated metal tube, the straight-walled portion of the corrugated metal tube extending beyond a fit-engagement groove;

a socket fitting having a radially inwardly directed collar-like portion, the socket fitting being securely compressed on an outer surface of an end portion of the outer layer; and wherein an inner end portion of the collar-like portion is fitted in and engaged with the fit-engagement groove of the connecting part while clamping the straight-walled portion.

2. An elongated hose with corrugated metal tube for conveying highly permeable fluid comprising:

an inner layer comprising a corrugated metal tube having corrugation hills and valleys, wherein the corrugation hills and valleys are annular;

an outer layer circumscribing a radial outer side of the inner layer;

a reinforced layer having reinforcing filament members and included in the outer layer, the reinforcing filament members being braided at a low braid angle, 40 degrees or lower, with respect to an axis, the reinforced layer thereby generating sufficient resistant to pressure exerted repeatedly by fluid conveyed by the hose;

a pipe-shaped connecting part formed with a fit-engagement groove on an outer peripheral surface thereof, the connecting part being inserted in a straight-walled portion formed on an axial end side of the corrugated metal tube;

a socket fitting having a radially inwardly directly collar-like portion, the socket fitting being securely compressed on an outer surface of an end portion of the outer layer;

wherein an inner end portion of the collar-like portion is fitted in and engaged with the fit-engagement groove of the connecting part while clamping the straight-walled portion; and wherein the straight-walled portion is deformed along the fit-engagement groove and is clamped with the inner end portion of the collar-like portion and the fit-engagement groove.

* * * * *